United States Patent
Soerensen

(10) Patent No.: US 11,261,850 B2
(45) Date of Patent: Mar. 1, 2022

(54) ELECTRICAL UNIT FOR A WIND TURBINE

(71) Applicant: Siemens Gamesa Renewable Energy A/S, Brande (DK)

(72) Inventor: Johnny Soerensen, Videbæk (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 49 days.

(21) Appl. No.: 16/476,936

(22) PCT Filed: Nov. 9, 2017

(86) PCT No.: PCT/EP2017/078700
§ 371 (c)(1),
(2) Date: Jul. 10, 2019

(87) PCT Pub. No.: WO2018/133965
PCT Pub. Date: Jul. 26, 2018

(65) Prior Publication Data
US 2020/0166022 A1 May 28, 2020

(30) Foreign Application Priority Data

Jan. 18, 2017 (DE) .................... 10 2017 200 758.3

(51) Int. Cl.
*F03D 80/80* (2016.01)
*F03D 13/10* (2016.01)
*F03D 13/20* (2016.01)

(52) U.S. Cl.
CPC ............. *F03D 80/82* (2016.05); *F03D 13/10* (2016.05); *F03D 13/20* (2016.05);
(Continued)

(58) Field of Classification Search
CPC .......... F03D 80/82; F03D 13/10; F03D 13/12; F05B 2230/60; F05B 2240/912; F05B 2240/95
See application file for complete search history.

(56) References Cited

U.S. PATENT DOCUMENTS

2007/0125037 A1 6/2007 Meiners
2009/0126309 A1* 5/2009 Lyness .................... F03D 13/20
52/650.3
(Continued)

FOREIGN PATENT DOCUMENTS

CN 102213194 A 10/2011
DE 102016219413 A1 4/2018
(Continued)

OTHER PUBLICATIONS

International Search Report dated Feb. 21, 2018 for Application No. PCT/EP2017/078700.
(Continued)

*Primary Examiner* — Sean Gugger
(74) *Attorney, Agent, or Firm* — Schmeiser, Olsen & Watts LLP

(57) ABSTRACT

Provided is a module for accommodating electrical equipment for controlling a wind turbine, the module including a first platform first platform and spaced apart from a but connected with each other by a connection element. The first platform is configured to be attached to the tower or a support structure of the wind turbine by means of a first mounting support. The second platform is configured to be attached to the tower or the supporting structure of the wind turbine by means of a second mounting support, the second mounting support including a plurality of second mounting support units. The first platform is arranged to be located below the second platform after being mounted inside the tower or the supporting structure of the wind turbine. The first platform has a plurality of first cutouts which correspond to the shape and the arrangement of the second mounting support units.

15 Claims, 11 Drawing Sheets

(52) U.S. Cl.
CPC ..... *F05B 2230/60* (2013.01); *F05B 2240/912* (2013.01); *F05B 2240/95* (2013.01)

(56) References Cited

U.S. PATENT DOCUMENTS

| | | | |
|---|---|---|---|
| 2010/0139180 A1* | 6/2010 | Meiners | F03D 13/10 |
| | | | 52/111 |
| 2011/0248506 A1 | 10/2011 | Ruiz Urien et al. | |
| 2013/0174508 A1* | 7/2013 | Reed | F03D 13/20 |
| | | | 52/655.1 |
| 2016/0108896 A1* | 4/2016 | Jane Panella | F03D 13/20 |
| | | | 52/36.4 |

FOREIGN PATENT DOCUMENTS

| | | | |
|---|---|---|---|
| EP | 2631479 A2 | 8/2013 | |
| EP | 2746577 A1 | 6/2014 | |
| WO | 2014070084 A2 | 5/2014 | |

OTHER PUBLICATIONS

International Search Report for application No. PCT/EP2017/078700 dated Feb. 21, 2018.

* cited by examiner

ELECTRICAL UNIT FOR A WIND TURBINE

CROSS-REFERENCE TO RELATED APPLICATIONS

This application claims priority to PCT Application No. PCT/US2017/078700, having a filing date of Nov. 9, 2017, which is based on German Application no. 10 2017 200 758.3 having a filing date of Jan. 18, 2017, the entire contents of which are hereby incorporated by reference.

FIELD OF TECHNOLOGY

The following relates to a module for accommodating electrical equipment for controlling a wind turbine. The following also relates to an electrical unit comprising such a module and corresponding electrical equipment. The following furthermore relates to a wind turbine generating electricity comprising such a module. Finally, the following relates to a method of mounting electrical equipment for controlling a wind turbine at a wind turbine.

BACKGROUND

Modern wind turbines of industrial size comprise a considerable amount of electrical equipment for operating and controlling the wind turbine. Examples thereof are converters, wind turbine control devices, battery banks, etc. These electrical components are typically arranged at the bottom part of the tower of the wind turbine, or—in the case of an offshore wind turbine—they may also be located in the support structure which supports the tower of the wind turbine.

In the case of onshore wind turbines, the electrical components are conventionally mounted upon the foundation of the wind turbine before mounting the tower. After installing the electrical equipment upon the foundation of the wind turbine, the first tower segment is subsequently mounted around the already installed electrical components. A first challenge of this conventionally pursued approach is that the time-consuming step-by-step assembly of the electrical components takes place outside under, potentially, rough conditions. A second challenge is that great care has to taken when lifting and lowering the first tower segment around the electrical components to not damage these delicate parts.

In the case of offshore wind turbines, it is known to mount the electrical components in the transition piece (which is a part of the support structure mentioned above) ashore. A first challenge of this is that the time-consuming work of assembling, mounting and testing the electrical equipment takes place at elevated heights, as the transition piece generally needs to be in a substantially vertical position during installation of the electrical components. Exemplarily, if the electrical components are placed in the top part of the transition piece, the work needs to be carried out at heights of e.g. 20-30 meters above ground. A second challenge is that the work typically needs to be carried out in a rough environment, as mounting of the electrical components into the transition piece usually takes place outside, e.g. at a quay site.

For offshore turbines, it is alternatively known to pre-mount the electrical equipment in a tower segment—or even the full tower—ashore (instead of pre-mounting in a transition piece), and subsequently transport the tower segment of entire tower fully assembled to the offshore installation site.

In yet another alternative, the mounting of the electrical equipment in a tower or tower segment is carried out off-shore, i.e. on a transport vessel, prior to placing the tower or tower segment on the support structure.

The European patent application EP 2 631 479 A2 proposes prefabrication of an electrical unit comprising electrical components of a wind turbine. The mounting of this prefabricated unit to the support structure of an offshore wind turbine may be carried out either onshore or offshore.

The cited patent application is, however, silent how such a prefabricated unit needs to be configured concretely and how mounting of such a unit into the support structure of an offshore wind turbine could be carried out in practice.

SUMMARY

An aspect relates to a module for accommodating electrical equipment for controlling a wind turbine. The module comprises a first platform and a second platform, wherein the first platform and the second platform are spaced apart but connected with each other by a connection element. The first platform is destined to be attached to the tower of the wind turbine or to a supporting structure of the wind turbine by means of a first mounting support of the wind turbine. The second platform is destined to be attached to the tower or the supporting structure of the wind turbine by means of a second mounting support of the wind turbine, the second mounting support comprising a plurality of second mounting support units. The first platform is arranged to be located below the second platform after being mounted inside the tower or the supporting structure of the wind turbine. Furthermore, the module is characterized in that the first platform has a plurality of first cutouts which correspond to the shape and the arrangement of the second mounting support units.

A key aspect of the present embodiment of the invention is that the module, in particular the platforms of the module, comprises a specific design which allows a surprisingly easy and facilitated way to mount the module into or at the wind turbine. As the first platform has a plurality of first cutouts and as these first cutouts are shaped and arranged such that they correspond to the second mounting support units, the first platform is able to pass the second mounting support units without being blocked by them. This enables an insertion of the module as a whole into the bottom part of the tower or into the supporting structure of the wind turbine in one step. Therefore, a prefabricated module can be used which shortens the assembly and mounting time considerably. In particular it can even be said that the assembly time onsite, either at the quay site or at the offshore or onshore wind turbine installation site, is completely avoided by using an inventive module. Thus, working time at the installation site is considerably reduced. This is favorable for any wind turbine installation, but is of extraordinary importance for offshore wind turbine installation where installation time is always extremely expensive.

Note that the platforms, in particular the first platform and the second platform, are usually designed as substantially planar plate-like elements. These platforms may for example comprise a grating for providing area to place the electrical components. Additionally, the platforms may comprise reinforced sections which are able to be heavily loaded by heavy electrical equipment or, for example, by a winch which is pulling a subsea cable into the support structure of the wind turbine.

Furthermore note that, while the first platform according to the embodiment of the invention necessarily is equipped with a plurality of first cutouts, the second platform may or may not comprise cutouts. Whether the second platform needs to comprise cutouts depends, for instance, on the fact if there exists a further module being arranged above the module. If this is the case—and there are mounted mounting support units in relation to the further module at the inner walls of the tower or the supporting structure of the wind turbine—the second platform of the module might need to be configured with cutouts as well, in order to ensure that the second platform is able to pass along the mounting support units of the further module, which are situated above the mounting support units of the module.

The mounting support of the wind turbine, in particular the first mounting support and the second mounting support, is understood as any device which is arranged and prepared to carry the first and second platform, respectively. The mounting support is also referred to as a retainer. As an example, the mounting support can be designed as a flange. The mounting support may comprise several separate mounting support units or it may in principle also be designed as one element, e.g. a ring-shaped element which is mounted to the bottom part of the tower or the support structure of the wind turbine and is destined to carry the platform. While the first mounting support may in principle have any shape such as a ring or as separate flanges, the second support unit necessarily needs to comprise several mounting support units such that the first platform of the module can be lowered and passed by the second support unit without being blocked by the second support unit.

In an advantageous embodiment of the invention the number of first cutouts equals the number of second mounting support units. In other words, although in principle it is only necessary that the first platform has at least so many first cutouts as there exist second mounting support units, it is preferred that the first platform only has exactly the necessary number of first cutouts, which is exactly equally the number of second mounting support units. This allows a most efficient exploitation of the area available at the first platform.

In another embodiment of the invention, the area of one of the first cutouts in a plane perpendicular to the length axis of the tower or the length axis of the support structure of the wind turbine is greater than the area of the corresponding second mounting support unit in the same plane.

In other words, the cutout has an open area which is at least slightly larger than the corresponding mounting support unit which in the case of the first cutout is the second mounting support unit. This allows a smooth passing of the first platform along the second mounting support. In practice, this will be a trade-off between the additional space in which the cutout exceeds the area of the mounting support unit and which facilitates some tolerances during mounting and lowering of the first platform versus an optimum exploitation of the available area at the first platform.

In another embodiment of the invention, the area of the first cutout in the plane perpendicular to the length axis of the tower or the length axis of the support structure of the wind turbine is smaller than the double of the area of the corresponding second mounting support unit in the same plane.

This requirement represents the desire of a wind turbine designer to best possibly benefit and exploit the space available at the platforms. Therefore, the cutouts shall only occupy the area which is needed for a safe and reliable installation of the module at the wind turbine.

In another embodiment of the invention, the module further comprises a third platform which is spaced apart but connected with the second platform, and the second platform is arranged between the first platform and the third platform. The third platform is designed to be attached to a bottom part of the tower of the wind turbine or a supporting structure of the wind turbine by means of a third mounting support of the wind turbine, wherein the third mounting support comprises a plurality of the third mounting support units.

In other words, the module may well comprise more than only two platforms, such as for example three, four, five, six or even more platforms. The number of platforms depends, for example, on the amount of electric equipment which needs to be provided at the wind turbine. The amount of platforms also depends on the diameter of the bottom part of the tower or the supporting structure of the wind turbine. The number of platforms also depends on the area which is needed for the cutouts at the platforms.

Finally, also note that the distance between two adjacent platforms, namely for example between the first and the second platform and the second and the third platform, may in general also depend. If more space is available between two adjacent platforms generally less platforms are needed. Note that if there exist three platforms, namely a first platform, a second platform and a third platform, the first and the second platforms do need cutouts, while the third platform does not necessarily need to have cutouts. Likewise, the first mounting support may in principle have any shape, while the second and third mounting support each need to comprise a plurality of second mounting support units and third mounting support units, respectively.

The embodiment of a module, wherein the first platform does not only have a plurality of first cutouts corresponding to the second mounting support units but also has a plurality of second cutouts corresponding to the third mounting support units, enable an insertion of the module into the tower or the supporting structure of the wind turbine without any twisting of the module being necessary. In other words, assuming that the mounting support units, in particular the second mounting support units and the third mounting support unit are arranged at different positions not only vertically but also horizontally, and provided that the first platform and second platform have the corresponding cutouts respectively, the module can be just moved downwards into the tower or supporting structure of the wind turbine without being blocked at the second or third mounting support.

Such a module is advantageously achieved if the second platform has a plurality of first cutouts corresponding in shape and arrangement to the third mounting support units.

Alternatively, the second cutouts of the first platform may also be similarly shaped and arranged as the first cutouts of the second platform. The focus here is at the same arrangement, i.e. at the same position of the second cutouts of the first platform and the first cutouts of the second platform.

This enables a provision of the second mounting support unit and the third mounting support units in one vertical line, i.e. without any horizontal displacement. This could be advantageous in terms of ease of manufacturing. In return, however, the module needs to be twisted, in other words turned, during insertion of the module into the tower or the support structure of the wind turbine. Otherwise, the second platform would not be safely attachable on the second mounting support unit.

The embodiment of the invention is also related to an electrical unit of a wind turbine, wherein the electrical unit comprises a module according to one of the embodiments described above and electrical equipment for controlling the wind turbine. The electrical equipment is arranged at the first platform and/or the second platform of the module.

In case that the module even comprises more than two platforms, the electrical equipment may of course also or exclusively be arranged at one or several of the further platforms.

Such an electrical unit, in other word the provision of such a electrical unit, has the advantage that preassembly is not only restricted and carried out for the module as such but also to the electric equipment which is mounted at the platforms of the module. This has the advantage that testing of the electrical equipment can also be done and carried out before the module with the electrical equipment is inserted, i.e. mounted, at the wind turbine. This is especially advantageous for offshore wind turbine installations. As time for installation is extremely expensive offshore, it is advantageous to check the cabling and do the connections between the diverse electrical equipment onshore and before the electrical unit is transported to the installation site. This saves or completely eliminates the time needed for arranging and testing the electrical equipment offshore.

However, also for onshore installations, the provision of an electrical unit comprising a module and the corresponding electric equipment is beneficial.

The embodiment of the invention is further related to a wind turbine for generating electricity, wherein the wind turbine comprise a tower, a support structure for supporting tower, a module for accommodating electrical equipment for controlling the wind turbine, wherein the module comprises a first platform and a second platform, wherein the first platform and the second platform are spaced apart connected with each other by a connection element, a first mounting support for carrying the first platform of the module and attaching it to the support structure or the bottom part of the tower, and a second mounting support for carrying the second platform of the module and attaching it to the support structure or to the bottom part of the tower, the second mounting support comprising a plurality of second mounting support units. The first platform is arranged to be located below the second platform after being mounted inside the tower or the supporting structure of the wind turbine. The wind turbine is furthermore characterized in that the first platform has a plurality of first cutouts which corresponds to the shape and the arrangement of the second mounting support unit.

In other words, the described embodiment of the inventions of a module for accommodating electrical equipment for controlling a wind turbine and the described electrical unit comprising such a module and the corresponding electrical equipment may advantageously be provided together with the entire wind turbine. In other words, the wind turbine comprising such an electrical unit or such a module is also comprised by the current patent application.

In an advantageous embodiment of the invention, the diameter of the second platform in a plane perpendicular to the length axis of the tower or the support structure of the wind turbine is larger than the maximum distance between two of the plurality of second mounting support units.

This means that for a most efficient exploitation of the space available in the bottom part of the tower or the support structure of the wind turbine, the platform has a diameter and dimensions which extend further outwards than the extension of the mounting support units towards the center of the tower or the support structure. This means that beside the cutout regions and a relatively small gap between the outer line of the platform and the inner wall of the tower or the support structure of the wind turbine, the space is fully exploited within the wind turbine. This allows an optimum arrangement of the electrical equipment on the platforms.

In another embodiment of the invention, at least one of the second mounting support units comprises a slot which is designed such that the second platform can slide into it.

If the second platform relies on such a slide-and-lock feature, it necessarily needs to be equipped with cutouts.

In other words, at least one of the second mounting support units comprises a reception area for an improved reception of the second platform. Such a mounting support design may also be described as a locking mechanism. The advantage is that the platform which is locked or arranged in a so designed mounting support unit is prevented from misalignment slipping out of the reception area.

In another embodiment of the invention at least one of the second mounting support units comprises a sliding assistance for providing guidance for the second platform during sliding it.

Such a sliding assistance at a mounting support unit is a means for improving the alignment of the platform with the mounting support unit. It is an evaluable tool or device in the case that the platform is designed to be turned or twisted into position. The sliding assistance as such can be designed in various ways. The common feature or functionality of the assistance is to give a guidance to the platform in order to catch it when the platform is slit into position.

Finally, the embodiment of the invention is related to a method to mount electrical equipment for controlling a wind turbine at the wind turbine. The method comprises the steps of:

a) Inserting a prefabricated module according to one of the embodiments described above into the bottom part of the tower or into the support structure of the wind turbine by means of a downwards orientated movement, b) Moving the first platform along the second mounting support, c) Moving the module further downwards until the first platform reaches the first mounting support, and d) Attach the first platform to the first mounting support.

This method is particularly suited in combination with the described module as the module is designed for a fast and uncomplicated way of mounting the module into the bottom part of the tower or into the support structure of the wind turbine. The platforms are particularly designed for being passed along corresponding support units and thus the first platform can easily be moved along the second mounting support and then it can be moved further downwards until the first platform reaches the first mounting support. Note that the method of mounting the prefabricated module into the wind turbine does not necessarily need any rotational movements or other specific movements.

In an advantageous embodiment of the invention, however, the method comprises a further step of turning the module about its vertical axis, wherein the vertical axis is defined as being substantially vertical with regard to the planar exertions of the first and second platform, respectively. In other words, the method includes a step of turning and twisting the platforms such that the cutouts are brought into the position with its corresponding mounting support units. Generally, the inclusion of this turning or twisting step has the advantage that the mounting support units can, for example, be arranged in a vertical line. Note that for more than three platforms more than only one turning step may be required, depending on the concrete arrangement of the cutouts of the platforms with respect to the location of the corresponding mounting support units.

BRIEF DESCRIPTION

Some of the embodiments will be described in detail, with references to the following Figures, wherein like designations denote like members, wherein.

DETAILED DESCRIPTION

Figure 1:
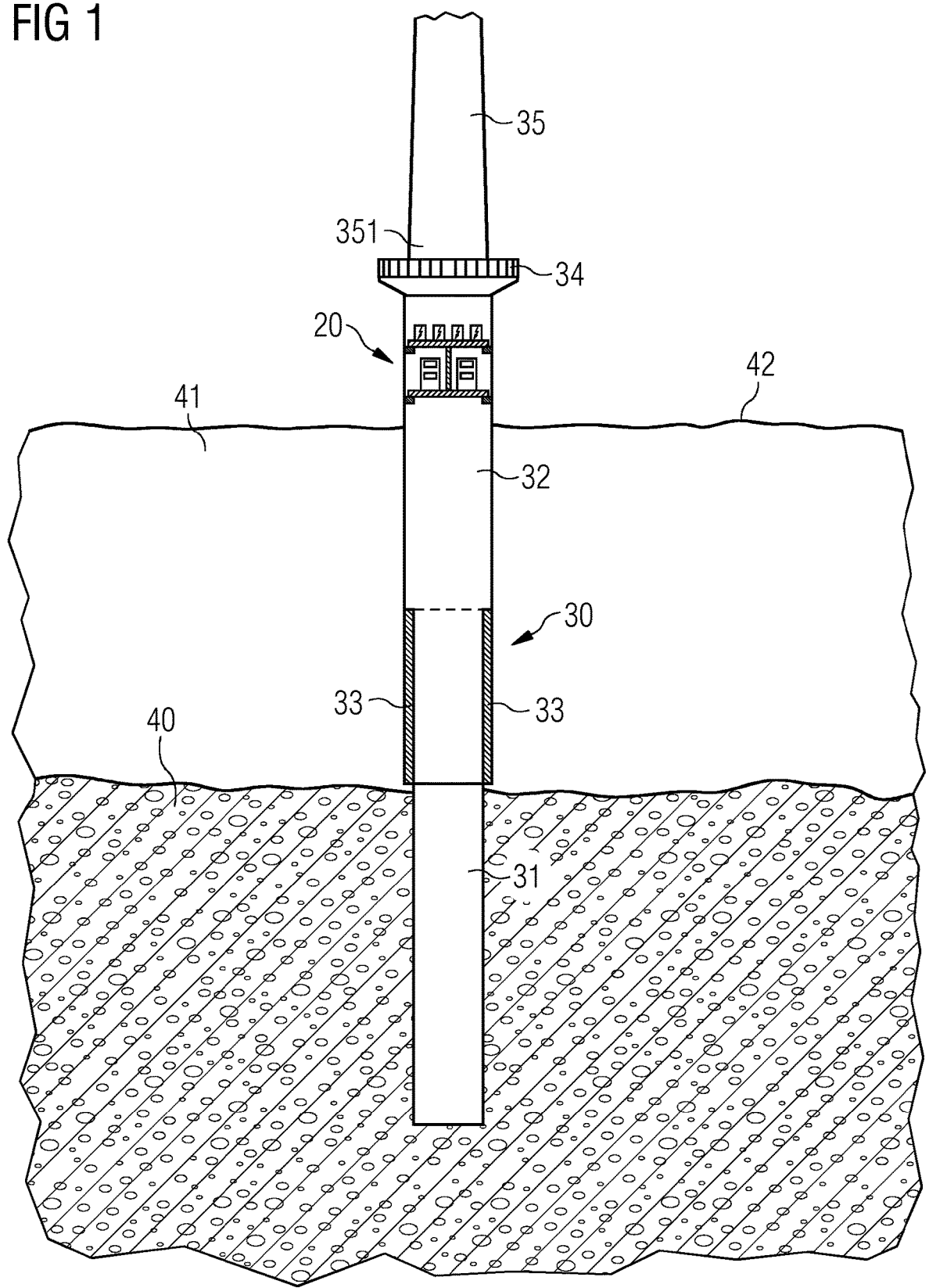
FIG. 1 shows a part of an offshore wind turbine.

The illustration in the drawings is in schematic form. It is noted that in different figures, similar or identical elements may be provided with the same reference signs.

FIG. 1 illustrates a part of an offshore wind turbine. In this example, the support structure of the wind turbine is realized by a combination of a monopile 31 with a transition piece 32.

The monopile 31 is configured as a hollow pipe which is vertically driven into a seabed 40. To give, exemplarily, dimensions of the monopile 31, the monopile 31 could have a longitudinal extension of twenty to thirty meters of which approximately one half or two thirds are driven into the seabed 40. It is important to drive the monopile 31 considerably into the seabed 40, i.e. to carry out the drilling or driving until a significant depth, in order to ensure that the construction which is subsequently placed on the monopile 31 is stable and robust over a long period of time.

The support structure of the wind turbine also comprises the transition piece 32 which is aligned substantially parallel to the monopile 31. In other words, the transition piece 32 is mounted on top of the monopile 31. However, as can be seen in FIG. 1, the support structure 30 comprises a rather large connection area between the monopile 31 and the transition piece 32. This relatively large overlap which can easily amount up to a length between ten to fifteen meters is necessary in order to ensure the required stability of the whole arrangement. Although, in theory, different connection types between the monopile 31 and the transition piece 32 are possible, in practice, a grouted connection 33 is a well proven technique to realize this connection. The grouted connection 33 needs to be carried out by a specialized equipment and devices. The choice of the grout and the curing of the grout contributes to the robustness and stability of the entire system. The length of the transition piece 32 is chosen such that it typically protrudes from the sea 41 by several meters. In particular, the distance from the top of the transition piece 32 until the sea level 42 is arranged between two and ten meters.

On top of the transition piece 32, there is provided the tower 35 of the wind turbine. In FIG. 1, only a part of the tower 35, namely the bottom part 351 of the tower 35, is illustrated. In the connection section between the transition piece 32 and the tower 35, there is provided a work platform 34. The work platform 34 is realized as a type of a balcony, which surrounds the substantially circular outer shape of the bottom part 351 of the tower 35. The work platform 34 serves to facilitate access for the service personnel to enter the tower 35 of the wind turbine. This is especially useful for landing and overcome the gap between the vessel and the wind turbine. To this end, the work platform 34 may also provide a set of stairs, which reach down from the work platform 32 close to the sea level 42. This set of stairs may be realized as a ladder or it may more resemble a conventional staircase.

The wind turbine as illustrated in FIG. 1 comprises an electrical unit 20 in the top part of the transition piece 32. Note that, for sake of simplicity and for illustration of the inventive concept, only two platforms of the electrical unit 20 are illustrated in FIG. 1. In real wind turbines, modules with more than two platforms are usually preferred, in order to provide the space for the diverse electrical equipment to install.

Figure 2:
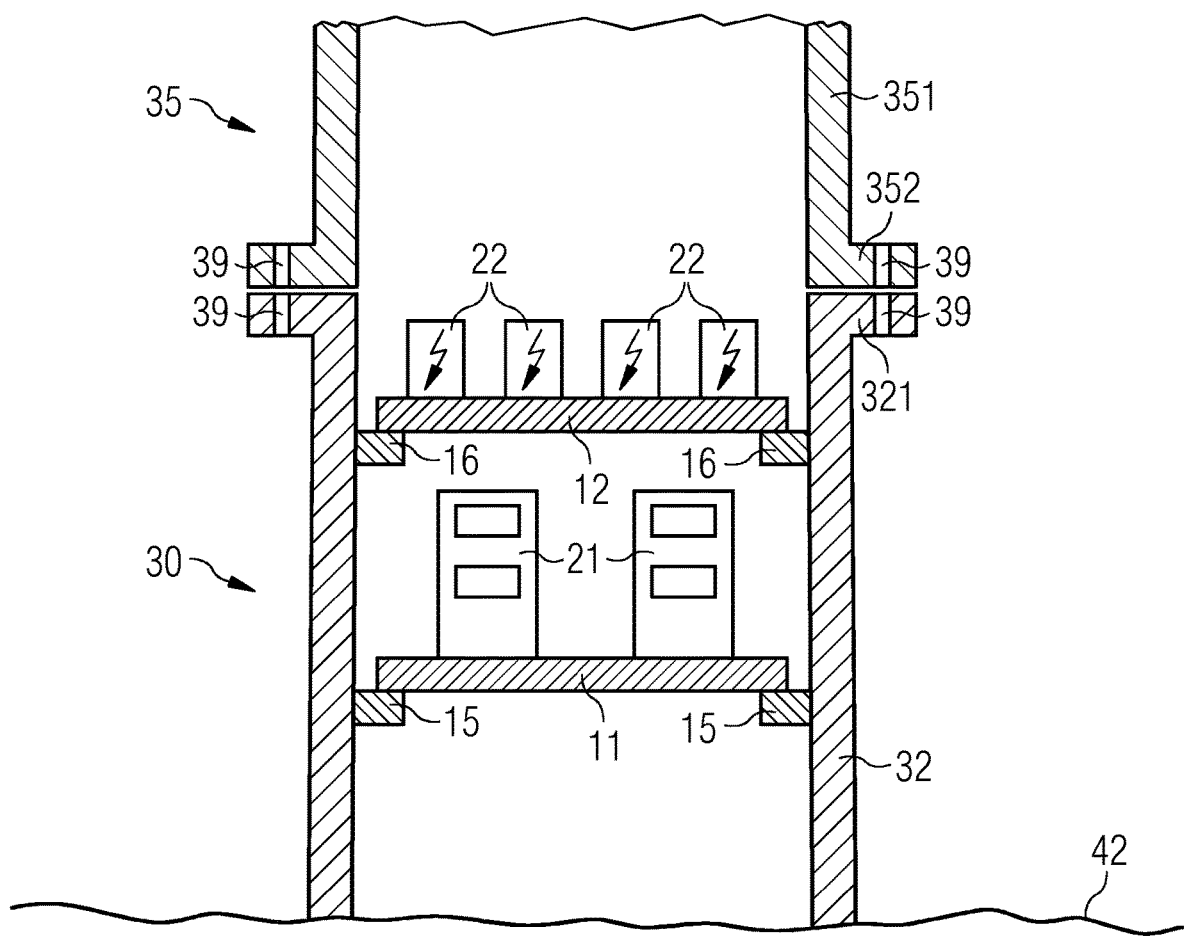
FIG. 2 shows an electrical unit of an offshore wind turbine according to the state of the art.

FIG. 2 shows a close-up view of the electrical unit 20 of an offshore wind turbine according to the prior art. The support structure 30, which in this exemplary case comprises a monopile (not shown) and a transition piece 32, comprises a first mounting support 15 and a second mounting support 16. Both mounting supports 15, 16 are shaped as flanges and are attached to the inner walls of the transition piece 32. Both mounting supports, the first mounting support 15 and the second mounting support 16, are similar in size and shape. A first platform 11 is attached at the first mounting support 15. Likewise, a second platform 12 is arranged and attached to the second mounting support 16. Both platforms, the first platform 11 and the second platform 12, are arranged and prepared to receive and accommodate electrical equipment. In the example as illustrated and FIG. 2, on the first platform 11 there are accommodated two switch boxes 21, while on the second platform 12, there is provided a set of four converters 22.

FIG. 2 also illustrates the attachment of the bottom part 351 of the tower 35 of the wind turbine to the transition piece 32. This attachment is realized by a bolted connection between the tower 35 and the transition piece 32. In particular, the connection is realized by bolts (not shown), which are inserted through bolt holes 39 which are basically configured as through-holes. The bolt holes 39 are arranged at an outer flange comprising one part being referred to as a transition piece flange 321 and one part being referred to as a bottom part tower flange 352.

Figure 3:
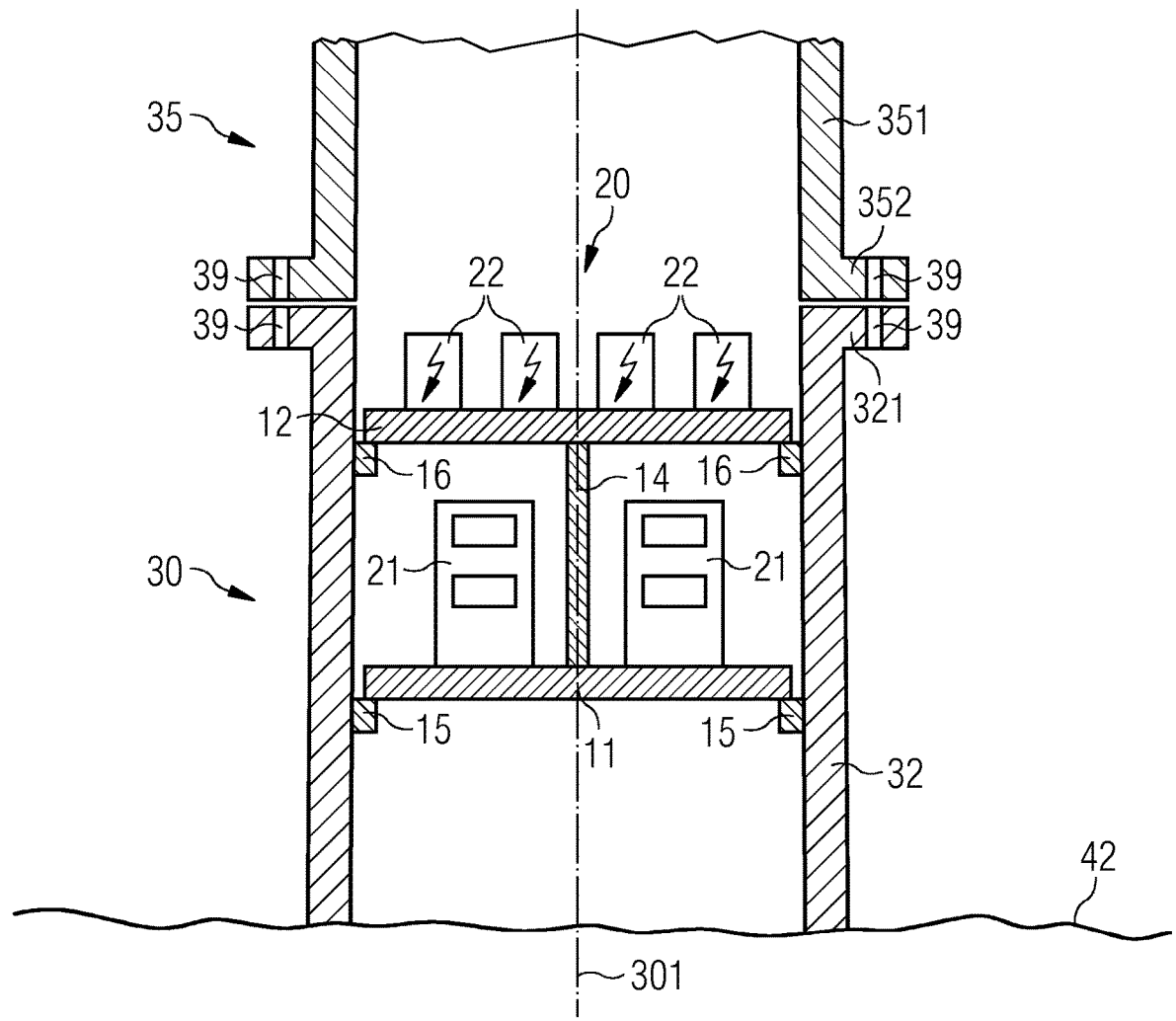
FIG. 3 shows an electrical unit of an offshore wind turbine according to an embodiment of the invention.

FIG. 3 shows a similar close-up view of an electrical unit 20 in an offshore wind turbine, but comprising an electrical unit 20 according to an embodiment of the invention.

Again, the support structure 30 comprises a monopile (not shown) and a transition piece 32. The support structure 30 comprises a vertical axis 301. The transition piece 32 comprises a first mounting support 15 and a second mounting support 16. Both mounting supports 15, 16 are shaped as flanges and are attached to the inner walls of the transition piece 32. Both mounting supports, the first mounting support 15 and the second mounting support 16 are similar in size and shape. Again, a first platform 11 is attached to the first mounting support 15 and a second platform 12 is arranged and attached to the second mounting support 16. Both platforms, the first platform 11 and the second platform 12, are arranged and prepared to receive and accommodate electrical equipment. Again, in the example as illustrated in FIG. 3, two switch boxes 21 are arranged on the first platform 11 and a set of four converters 22 are provided on the second platform 12.

The difference of the electrical unit 20 according to an embodiment of the invention and illustrated in FIG. 3, compared to the electrical unit 20 of the embodiment according to the prior art as illustrated in FIG. 2 is the provision of a connection element 14 which connects the first platform with the second platform 12. This connection element 14 is sketched as a straight member connecting both platforms 11, 12. As the illustration in the drawings are schematically, the concrete design and shape of the connection element 14 may well vary in practice. However, the key point is that the connection elements constitutes a rigid and robust connection between the two platforms 11, 12, such that the entire electrical unit 20 can be lowered into the transition piece 32 of the wind turbine.

In other words, only one single step is necessary for mounting the electrical unit 20 at the wind turbine. In contrast to the inventive concept, according to the prior art multiple steps are necessary as the assembly of the electrical unit 20 still needs to be carried out in the transition piece 32. Descriptively speaking, according to the prior art and the embodiment as illustrated in FIG. 2, in a first step the first platform 11 has to be load into the transition piece 32, and in a second step the second platform 12 has to be load into the transition piece 32. Additionally, both platforms 11, 12 have to be attached such as bolted or welded to the mounting supports 15, 16, respectively. Although connection of the platforms 11, 12 with the corresponding mounting supports 15, 16 still needs to be carried out according to the inventive concept, considerable time and efforts are saved due to the pre-assembly of the electrical unit before mounting it at the wind turbine.

In order to enable the one step mounting procedure of the pre-fabricated and preassembled electrical unit into the support structure or the tower of the wind turbine, a special design of the electrical unit is necessary. In particular, a specific design of the platforms 11, 12 is necessary. This specific design will be described and illustrated in more detail by help of several embodiments in the following.

Figure 4:
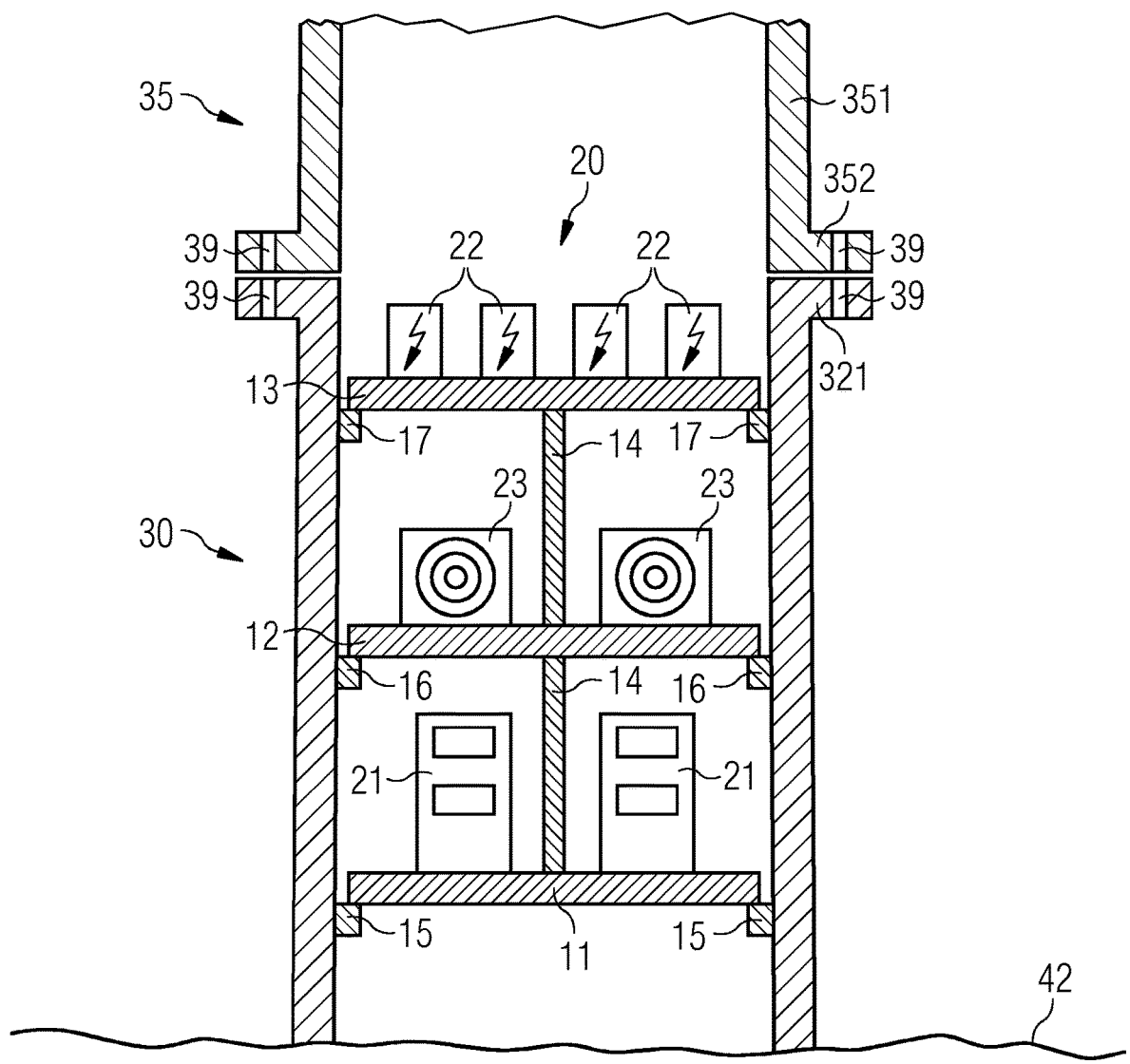
FIG. 4 shows an electrical unit of an offshore wind turbine according to another embodiment of the invention.

Before coming to the concrete realization of the platforms, FIG. 4 shows that the embodiment of the invention is by no means limited to the presence of only two platforms. Moreover, in practice it is preferred that a plurality of platforms, such as three or four or five or six or even more platforms exist at the electrical unit or the module, respectively. Thus, FIG. 4 just shows an example of three platforms being arranged at a transition piece 32 of an offshore wind turbine.

For sake of conciseness, similar or identical elements in FIG. 4 compared to FIG. 3 will not be repeated. Only those elements which are added will be mentioned in the following. As it can be seen, the electrical unit 30 comprises furthermore a third platform 13 which is connected with the second platform 12 by means of the same connection element 14 which already connects the second platform 12 with the first platform 11. The third platform 13 is attached to the inner walls of the transition piece 32 by means of a third mounting support 17. Also the third platform 13 is arranged and prepared for receiving and accommodating electrical equipment of the wind turbine. In the example as illustrated in FIG. 4, two switchboards 21 are arranged at the first platform 11, two cooling devices 23 are provided at the second platform 12 and a set of four converters 22 are arranged at the third platform 13. Again, a specific design and arrangement of the platforms are necessary if the whole and entire electrical unit 20 shall be load in basically one step into the transition piece 32.

Figure 5:
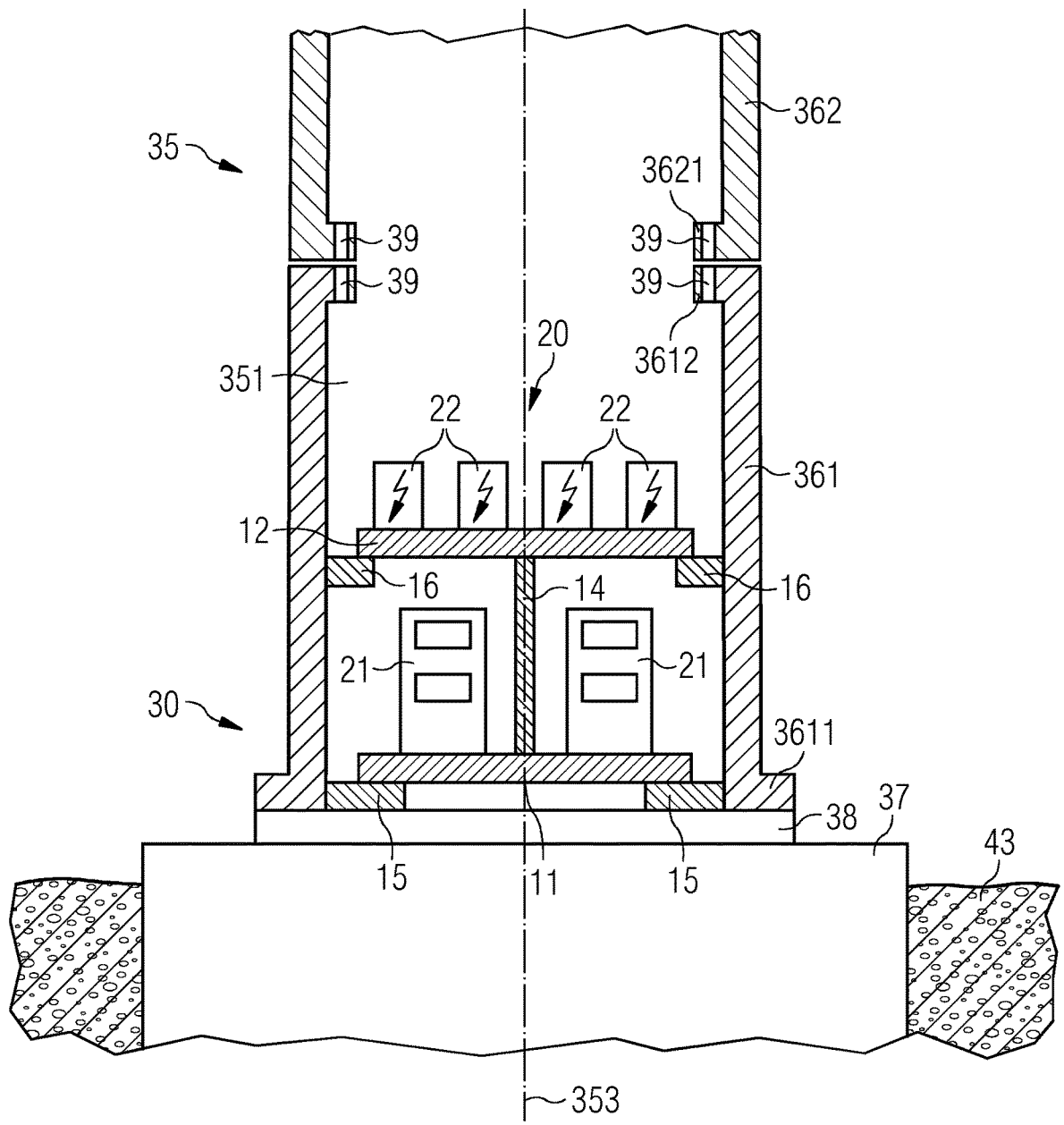
FIG. 5 shows an electrical unit of an onshore wind turbine according to an embodiment of the invention.

Furthermore, the inventive concept is by no means limited to offshore wind turbines. FIG. 5 shows yet another example of using and benefitting of the embodiment of the invention. In this case, an electrical unit 20 comprising a first platform 11 which is connected by a connection element 14 with a second platform 12 is provided in the bottom part 351 of a tower 35 of an onshore wind turbine. Thus, it is stressed that in contrast to the embodiments as shown in FIGS. 3 and 4, the electrical unit is not provided in the support structure but in the tower as such.

Again, the first platform is carried and attached to a first mounting support 15, and the second platform 12 is attached to a second mounting support 16. The tower 35 is a segmented tower comprising a plurality of tower segments. FIG. 5 just illustrates the most bottom tower segment 361 and a second tower segment 362. The tower 35 has a length axis 353. Both tower segments 361, 362 are connected via a flange which is realized and composed of a first tower segment top flange 3612 and a second tower segment bottom flange 3621. Note that the first tower segment 361 is disposed on a base ring 38 which itself is arranged on top of the foundation 37 of the wind turbine. The foundation 37 together with the base ring 38 constitute the supporting structure of the onshore wind turbine. The foundation structure at a foundation 37 penetrates several meters into the ground 43 in order to ensure a reliable and safe installation of the wind turbine.

Similar to the advantages and benefits of installing a pre-fabricated electrical unit into an offshore wind turbine, the provision of a pre-fabricated electrical unit 20 in an onshore wind turbine is beneficial as well. Again, assembly of the electrical unit can be made in a preparatory step, for example in a safe and protected environment and time and efforts out in the field during installation of the wind turbine are kept to a minimum.

Figure 6:
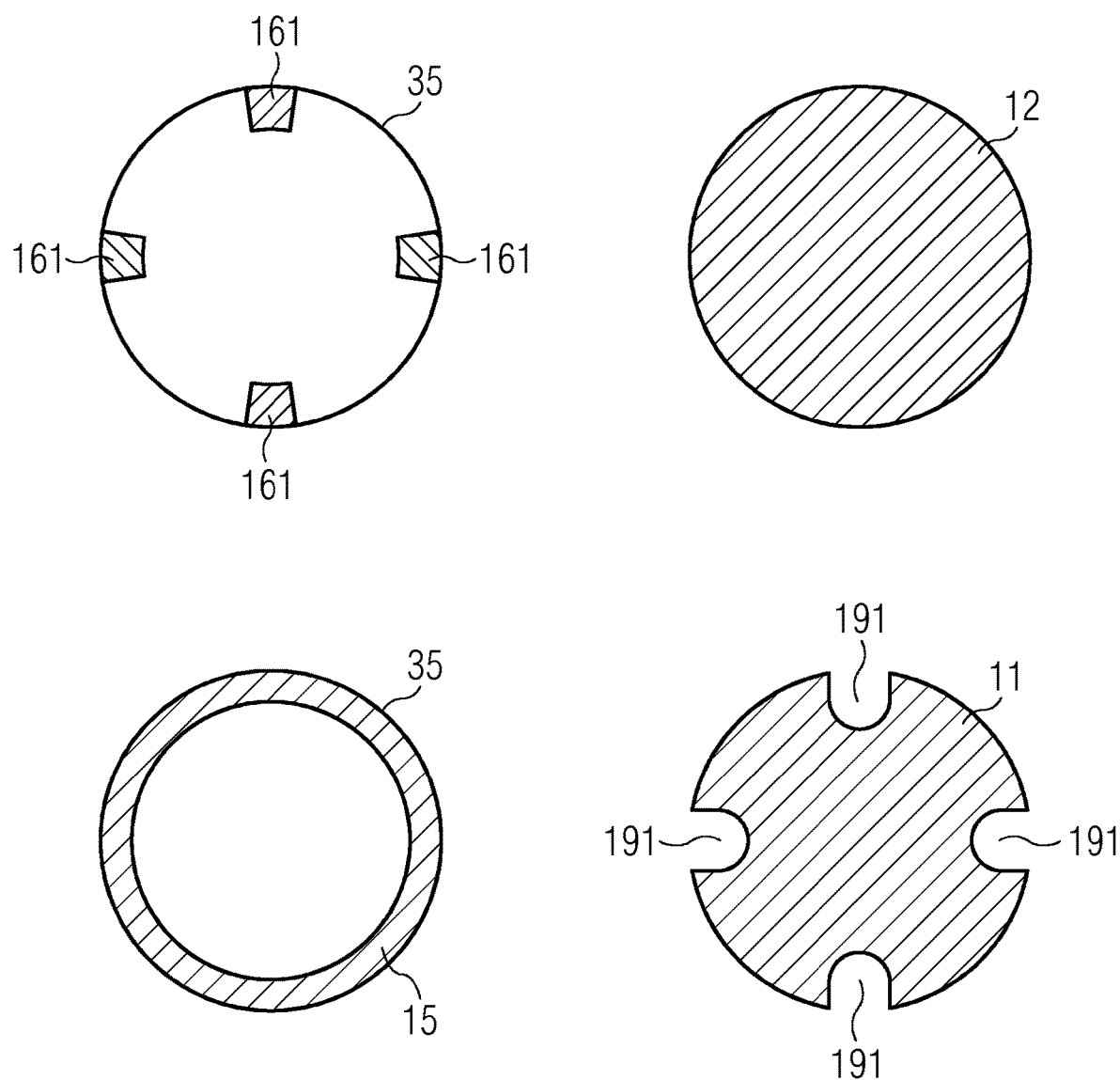
FIG. 6 shows components of an electrical unit in a top view according to a first embodiment of the invention.

FIG. 6 shows components of an electrical unit and a top view according to first embodiment of the invention. In the left column, the mounting support components are shown in an exploded view, while in the right column, the platforms are shown in an exploded view. In other words, in the top row the top most components are shown, while in the bottom row the bottom most components are shown.

In the top left corner, a top view on the tower 35 and a plurality of four second support units 161 is shown. It can be seen that the second mounting support units 161 are equally distributed at the circumference of the tower 35. In the bottom left part of FIG. 6 the first mounting support 15 can be seen. The first mounting support 15 is designed as a rim or annular flange which is attached to the inner wall of the tower 35.

Regarding the platforms, the first platform 11 comprises a plurality of first cutouts 191, while the second platform 12 is designed as a solid plate without any slits or cutouts.

It is noted and it is a key aspect of the present embodiment of the invention that the first cutouts 191 of the first platform 11 are adapted according to the location and the size of the second mounting support units 161. This is beneficial, if not necessary, for an insertion of the module from the top to the bottom into the tower of the wind turbine as the first platform 11 has to pass along the second mounting support units 161. Only if the first platform 11 has cutouts, namely first cutouts 191, which are at least as large in size as the space that the second mounting support units 161 occupy, a passing along these second support units 161 is possible. Note that the second platform 12 does not need to have any cutouts as it is located directly on the second mounting support units 161 and is not arranged to pass along these ones. It is also noted that while the first mounting support 15 may be designed as a continuous rim as shown in FIG. 6, this would not be possible for the second mounting support.

Figure 7:
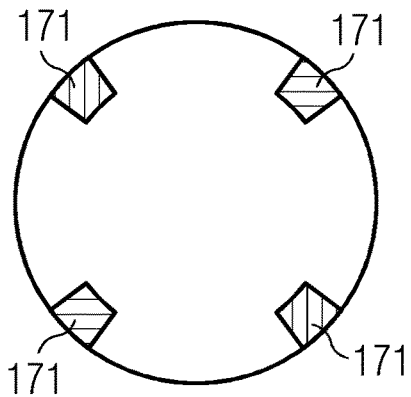
FIG. 7 shows components of an electrical unit in a top view according to a second embodiment of the invention.
Figure 7:
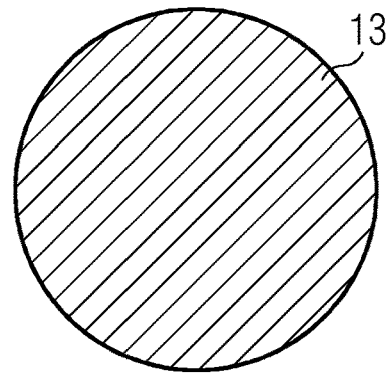
Figure 7:
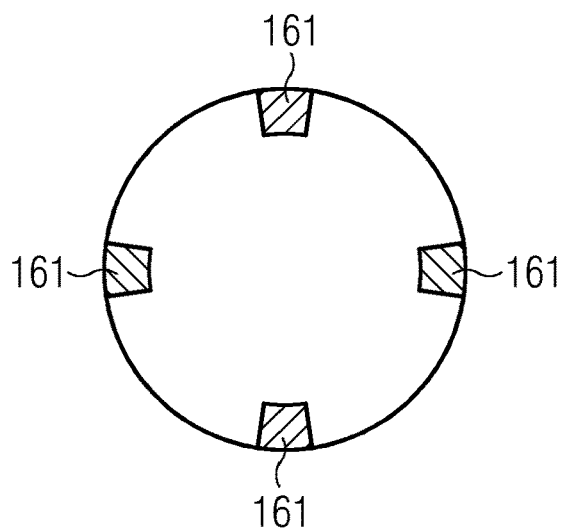
Figure 7:
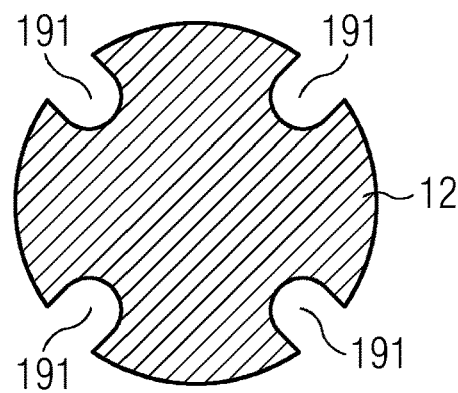
Figure 7:
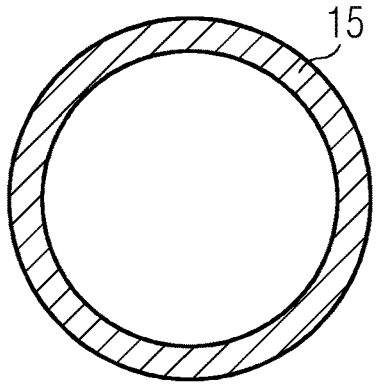
Figure 7:
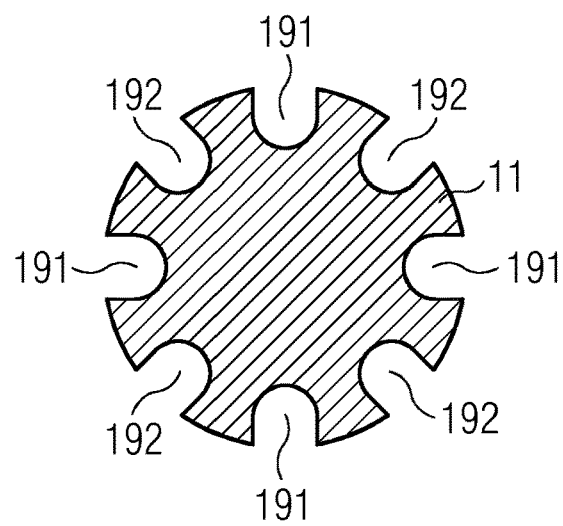

FIG. 7 shows an example with three platforms and three mounting supports. Again, the left column represents the mounting support and the right column represents the platforms. Also similar to FIG. 6, the top most row represents the top most elements in the module, the middle row represents the middle arranged and located elements in the module, and the bottom most row represents the bottom most components in the module. In the embodiment as illustrated in FIG. 7, the first mounting support 15 is designed as a rim, the second mounting support comprises a plurality of second support units 161 and the third mounting support comprises a plurality of third mounting support units 171. Note that the third mounting support unit 171 are arranged at different circumferential positions at the tower 35 compared to the second mounting support units 161.

Regarding the platforms, the first platform 11 comprises four first cutouts 191 and four second cutouts 191. The first cutouts 191 are designed and arranged such that they correspond to the second mounting support units 161 and the second cutouts 192 are designed and arranged such that they correspond to the third mounting support units 171. This is necessary as the first platform 11 first passes by the third mounting support units 171 and subsequently passes by the second mounting support units 161 until it reaches the rim of the first mounting support 15. Likewise, the second platform 12 also passes the third mounting support units 171, thus that corresponding cutouts are necessary while the first cutouts 191 are necessary as well. Obviously, the third platform 13 does not need to have any cutouts as it just lies and rests upon the third mounting support units 171.

Figure 8:
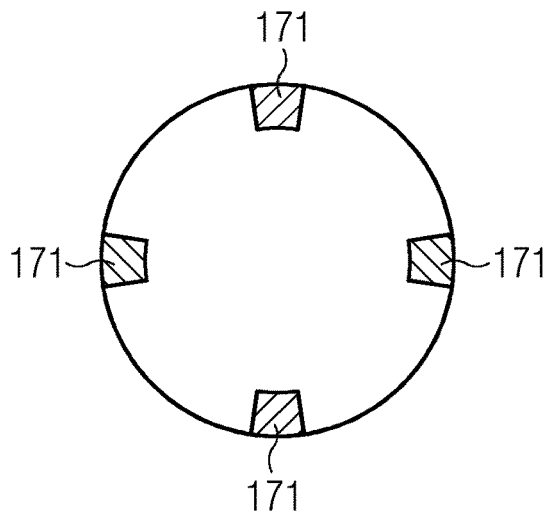
FIG. 8 shows components of an electrical unit in a top view according to a third embodiment of the invention.
Figure 8:
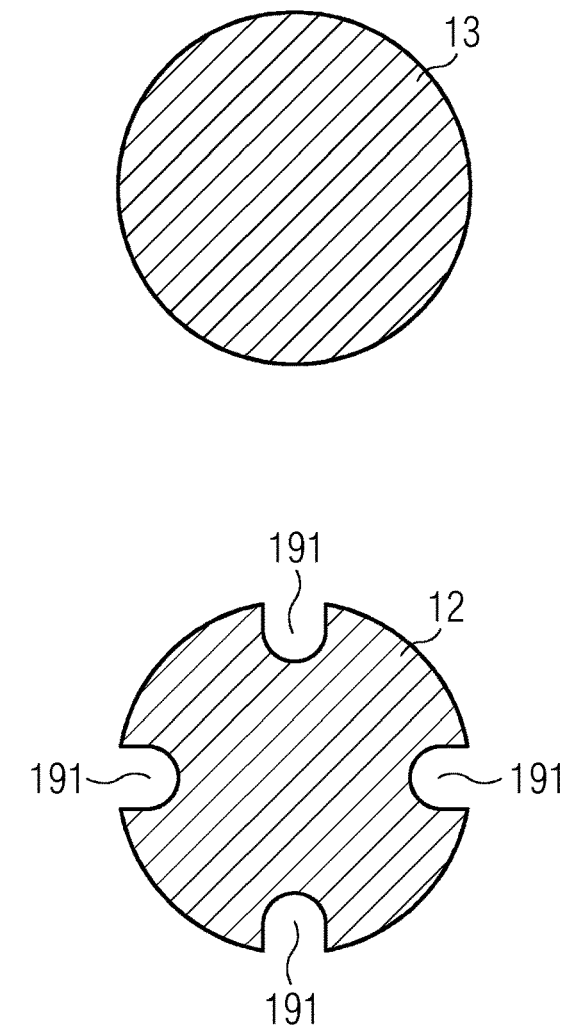
Figure 8:
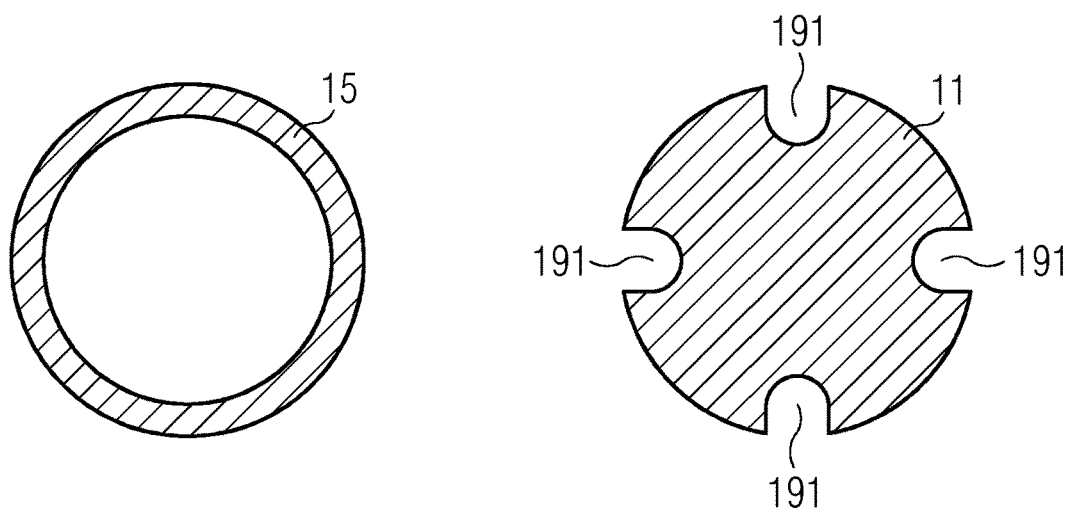

FIG. 8 shows a variant of the embodiment as illustrated in FIG. 7. It is similar to the embodiment shown in FIG. 7 in that it also comprises three platforms and three corresponding mounting supports. However, this time the first platform 11 only comprises a plurality of first cutouts 191 and no second cutouts 192. As a second difference, the second mounting support units 161 are arranged at the same circumferential position as the third mounting support units 171. If, hypothetically, the module is lowered from the top to the bottom in the present configuration, it still could be lowered until the first platform 11 reaches the rim of the first mounting support 15. However, the first cutouts 191 of the second platform 12 would not be supported and would not be carried by the second mounting support units 161 as the first cutouts 191 are at the exactly same position as the second mounting support units 161. Therefore, in the embodiment as shown in FIG. 8, a turning or twisting or rotation of the module is necessary. The twisting of the module needs to be done after the first platform 11 has passed the third mounting support unit 171 and before the final position is reached. This ensures that the second platform 12 rests upon the second mounting support units 161. Although a supplemental method step is necessary for mounting the electrical unit or module into the wind turbine, this could be advantageous as the mounting support units can be arranged in one vertical line. Another advantage is that less cutouts in the platforms are necessary. This saves money for providing the cutouts and also enlarges the space available on the platforms.

Figure 9:
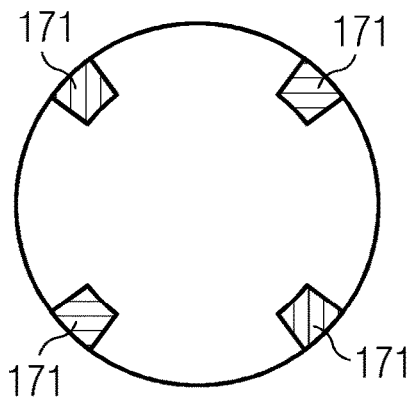
FIG. 9 shows components of an electrical unit in a top view according to a fourth embodiment of the invention.
Figure 9:
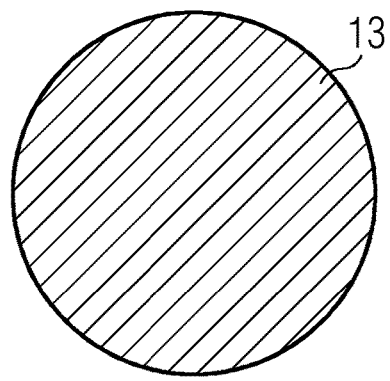
Figure 9:
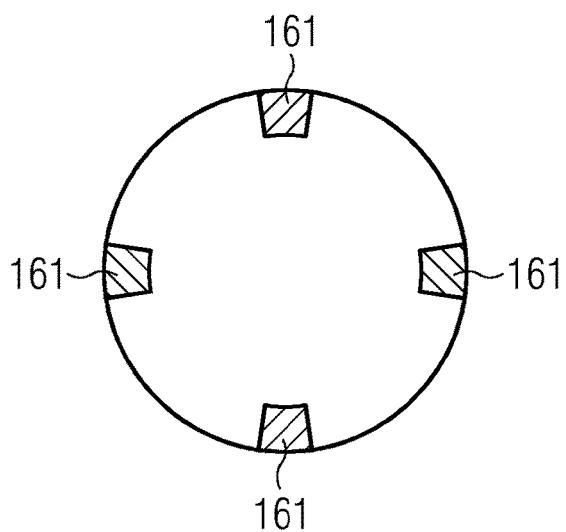
Figure 9:
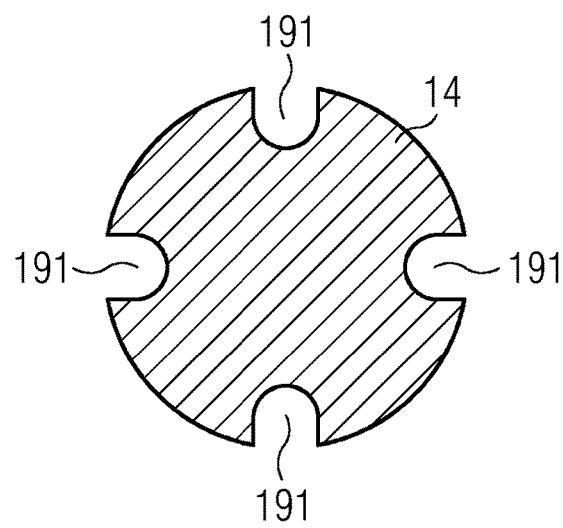
Figure 9:
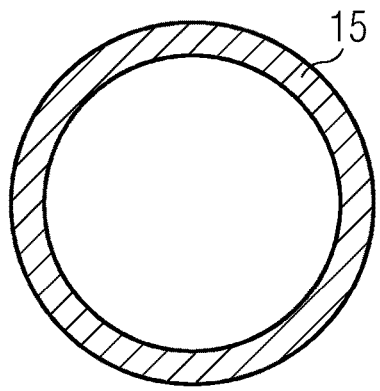
Figure 9:
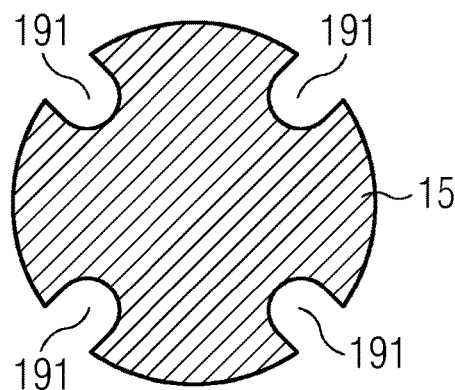

FIG. 9 shows yet another embodiment of the invention. Again, three platforms 11, 12, 13 and three mounting supports are shown. Here, a turning or twisting of the module is necessary as well in order to reach a good and efficient connection of the platforms with the mounting supports. The difference between the embodiment as shown in FIG. 9 and the one as illustrated in FIG. 8 is that a turning of the module is necessary precisely between the step or the moment when the first platform 11 has passed the third mounting support units 171 and before it reaches the second mounting support units 161. It is necessary and even a precise twist, in the example of FIG. 9, of forty-five degrees is necessary because otherwise the first platform 11 is not able to pass along the second mounting support units 161. However, as a result the number of cutouts can also be reduced compared for example to the embodiment as shown in FIG. 7 and it has just be accepted that a turning or twisting step needs to be included in the mounting procedure.

Figure 10:
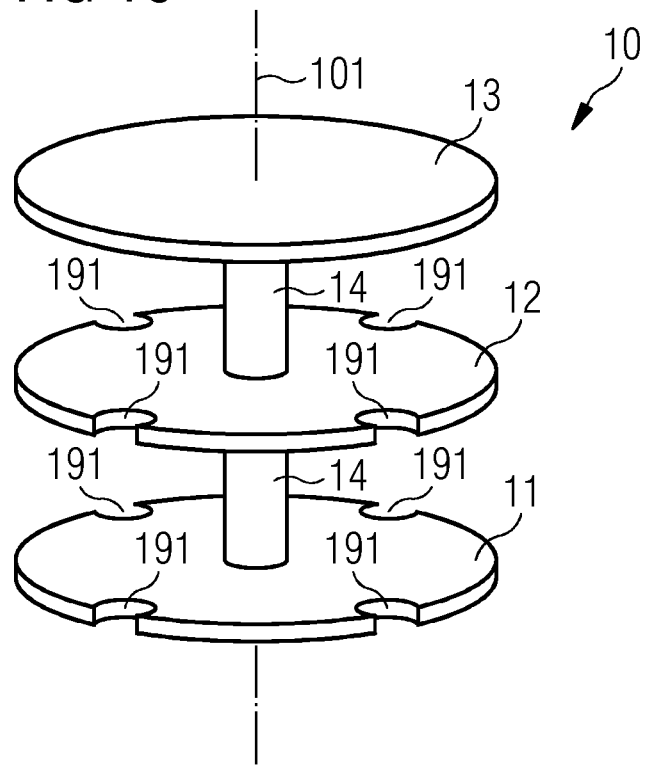
FIG. 10 shows a perspective view of a module for accommodating electrical equipment for controlling a wind turbine.

FIG. 10 shows a perspective view of a module for accommodating electrical equipment for controlling a wind turbine. The module 10 comprises a first platform 11, a second platform 12 and a third platform 13. The module 10 comprises a vertical axis 101. All three platforms 11, 12, 13 are connected with each other by means of a connection element 14. Note that except of the cutouts which will be referred to below the shape and the design of the platforms are similar if not identical. In particular, they all have the same diameter and they are all substantially parallel to each other.

The first platform 11 has a plurality of first cutouts 191. The cutouts, namely the first cutouts 191, correspond in size and location and respective arrangement to each other to the second mounting support units, not shown. Likewise, also the second platform 12 comprises a set of first cutouts 191. They are also fitted and matched to mounting support units, in particular to third mounting support units which are provided at the wind turbine and not shown in FIG. 10.

Figure 11:
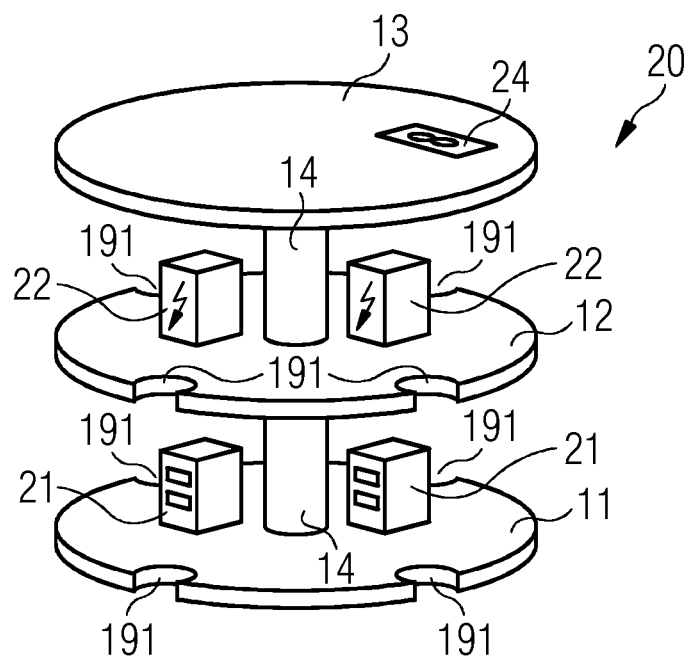
FIG. 11 shows a perspective view of an electrical unit comprising the module of FIG. 10 and the respective electrical equipment.

FIG. 11 shows an electrical unit 20 comprising of a module and electrical equipment. The module resembles the module as shown in FIG. 10. The first platform accommodates to switchboards 21, the second platform accommodates to converters 22 and the third platform is provided by a transfer point 24. The transfer point 24 is the connection of all electrical equipment provided in the platforms with the rest of the wind turbine. An advantage of the provision of such a transfer point 24 is that all electrical equipment can be fully tested and assessed before installation of the electrical units 20 in the wind turbine. Thus, the cabling and testing do not need to be carried out at the installation side. Moreover, the entire electrical unit 20 need only be connected via the transfer point 24 to the rest of the wind turbine. This additionally saves time and efforts during installation of the wind turbine.

FIGS. 12 to 15 show embodiments of a mounting support unit, in particular of a second mounting support unit 161. The second mounting support unit 161 is arranged and prepared to receive a second platform 12 of a module or an electrical unit.

Figure 12:
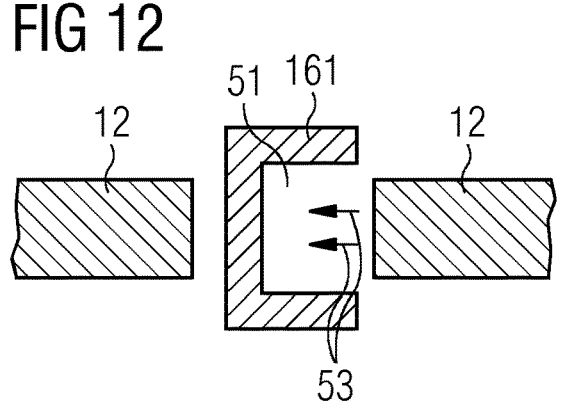
FIG. 12 shows a locking mechanism of a mounting support unit.

FIG. 12 shows a so-called locking mechanism where the platform, namely the second platform 12, is received and locked by a slot 51. This has the advantage that attachment and fixation of the platform with the mounting support is enhanced and facilitated. Obviously, this way of attaching the platform to the mounting support unit is only possible if a step of rotating the module is included in the installation procedure. The sense of rotation is referred to with the reference sign 53 in the FIGS. 12 to 15.

Figure 13:
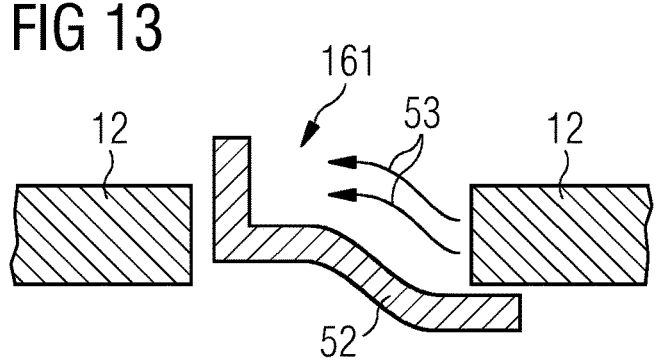
FIG. 13 shows a first embodiment of a sliding assistance for providing guidance for a platform during sliding at a mounting support unit.

FIG. 13 shows another embodiment of such a second mounting support unit 161. This time the mounting support unit does not have a slot or locking mechanism. Moreover, it has a sliding assistance 52 which facilitates and improves the sliding movement of the platform in particular the second platform 12 onto the third mounting support unit 161. In the example as illustrated in FIG. 13 the sliding movement is an slightly upwards orientated movement.

Figure 14:
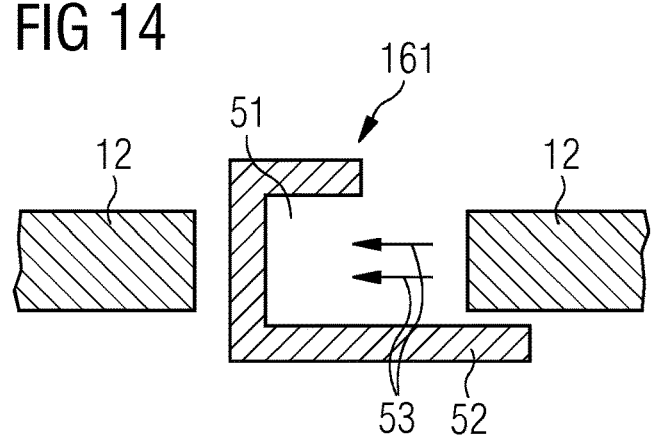
FIG. 14 shows a second embodiment of a sliding assistance for providing guidance for a platform during sliding at a mounting support unit.

FIG. 14 is yet another embodiment. This embodiment combines the advantages of having a slot 51 for locking the platform into the mounting support unit and having a sliding assistance 52. In this embodiment, the sliding assistance is designed as just straight extension of the mounting support unit.

Figure 15:
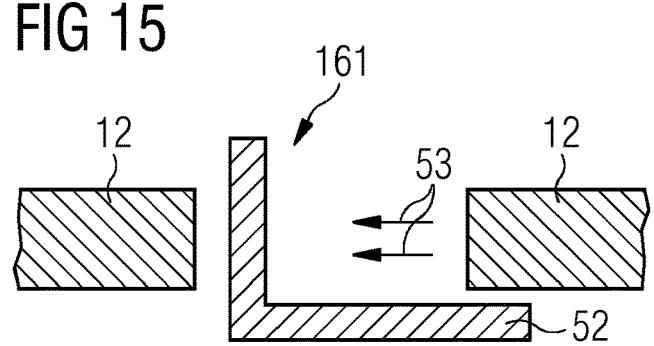
FIG. 15 shows a third embodiment of a sliding assistance for providing guidance for a platform during sliding at a mounting support unit.

FIG. 15 shows yet another embodiment of such a mounting support unit. Here, only a sliding assistance 52 is provided but no mounting mechanism. This has the advantage that it gives more freedom to design the mounting support unit and also the platform. It also enables a more tolerant movement of the second platform downwards to the mounting support units.

It is noted that all the shown embodiments in FIG. 12 to 15 relate to the case that the twisting or turning movement of the electrical unit or the module is foreseen.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A module for accommodating electrical equipment for controlling a wind turbine, the module comprising:
a first platform; and
at least a second platform, wherein the first platform and the second platform are spaced apart but connected with each other by a connection element;
wherein the first platform is configured to be attached to a tower or a support structure of the wind turbine by means of a first mounting support of the wind turbine, the first mounting support being a continuous rim fixed to the tower or the support structure at a first axial position of the tower or the support structure, wherein the second platform is configured to be attached to the tower or the supporting structure of the wind turbine by means of a second mounting support of the wind turbine, the second mounting support comprising a plurality of second mounting support units each fixed to the tower or the support structure at discrete circumferential locations at a second axial position of the tower or the support structure, the second axial location being different than the first axial position,
wherein the first platform is arranged to be located below the second platform after being mounted inside the tower or the supporting structure of the wind turbine;
wherein the first platform has a plurality of first cutouts which correspond to a shape and an arrangement of the second mounting support units.

2. The module according to claim 1, wherein a number of first cutouts equals a number of second mounting support units.

3. The module according to claim 1, wherein an area of one of the first cutouts in a plane perpendicular to a length axis of the tower or a length axis of the support structure of the wind turbine is greater than an area of the corresponding second mounting support unit in a same plane.

4. The module according to claim 3, wherein the area of the first cutout in the plane perpendicular to the length axis of the tower or the length axis of the support structure of the wind turbine is smaller than a double of the area of the corresponding second mounting support unit in the same plane.

5. The module according to claim 1, wherein:
the module further comprises a third platform, which is spaced apart but connected with the second platform,
the second platform is arranged between the first platform and the third platform, and
the third platform is configured to be attached to a bottom part of the tower of the wind turbine or a support structure of the wind turbine by means of a third mounting support of the wind turbine, further wherein the third mounting support comprises a plurality of third mounting support units.

6. The module according to claim 5, wherein the first platform has a plurality of second cutouts which correspond to a shape and an arrangement of the third mounting support units.

7. The module according to claim 5, wherein the second platform has a plurality of first cutouts which correspond to the shape and the arrangement of the third mounting support units.

8. The module according to claim 6, wherein the second cutouts of the first platform are similarly shaped and arranged as the first cutouts of the second platform.

9. An electrical unit for a wind turbine, wherein the electrical unit comprises a module according to claim 1 and electrical equipment for controlling the wind turbine, wherein the electrical equipment is arranged at the first platform and/or the second platform of the module.

10. A wind turbine for generating electricity, wherein the wind turbine comprises:
a tower;
a support structure for supporting the tower;
a module for accommodating electrical equipment for controlling the wind turbine, the module comprising a first platform and a second platform, wherein the first platform and the second platform are spaced apart but connected with each other by a connection element;
a first mounting support for carrying the first platform of the module and attaching the first platform to the tower or the support structure of the wind turbine, wherein the first mounting support is a continuous rim fixed to the tower or the support structure at a first axial position of the tower or the support structure; and a second mounting support for carrying the second platform of the module and attaching the second platform to the tower or the support structure of the wind turbine, the second mounting support comprising a plurality of second mounting support units each fixed to the tower or the support structure at discrete circumferential locations at a second axial position of the tower or the support structure, the second axial location being different than the first axial position;

wherein the first platform is arranged to be located below the second platform after being mounted inside the tower or the supporting structure of the wind turbine, wherein the first platform has a plurality of first cutouts which correspond to a shape and an arrangement of the second mounting support units.

11. The wind turbine according to claim 10, wherein a diameter of the second platform in a plane perpendicular to a length axis of the tower or the support structure of the wind turbine is larger than a maximum distance between two of the plurality of second mounting support units.

12. The wind turbine according to claim 10, wherein at least one of the second mounting support units comprises a slot which is designed such that the second platform can slide into the slot.

13. The wind turbine according to claim 12, wherein at least one of the second mounting support units comprises a sliding assistance for providing guidance for the second platform during sliding.

14. A method to mount electrical equipment for controlling a wind turbine at the wind turbine, the method comprising:
a) inserting a prefabricated module according to claim 1 into the tower or into the support structure of the wind turbine by means of a downwards orientated movement,
b) moving the first platform along the second mounting support,
c) moving the module further downwards until the first platform reaches the first mounting support, and
d) attaching the first platform to the first mounting support.

15. The method according to claim 14, further comprising e) turning the module about a vertical axis, which is defined as being substantially vertical with regard to the planar extensions of the first and second platform, respectively, to be carried out after step b) and before step d).

* * * * *